Jan. 9, 1940.  M. CENTENO V  2,186,203

OPTICAL FILTER

Filed Dec. 11, 1937

INVENTOR

Melchor Centeno V.

Patented Jan. 9, 1940

2,186,203

UNITED STATES PATENT OFFICE 2,186,203

OPTICAL FILTER

Melchor Centeno, V, New York, N. Y.

Application December 11, 1937, Serial No. 179,312

4 Claims. (Cl. 88—106)

This invention relates to optical filters, either selective or neutral in their transmission characteristics.

The principal object of the invention is to provide a simple and economical optical filter whose transparency can be adjusted by the operator.

Another object of the invention is to provide a neutral optical filter adjustable as to its transmissibility within definite limits.

A further object of the invention is to provide a selective optical filter adjustable as to its transmissibility within definite limits.

Further objects of the invention will be described or will become apparent during the course of this specification.

Essentially, the invention consists of a pair of flat elements juxtaposed face to face, each of said elements formed by a recurrent pattern of dark and light portions, and mechanical means whereby said elements can be moved with respect to each other in their planes, thereby permitting a larger or smaller amount of radiation to pass through the combined juxtaposed elements.

A consideration of the following description and accompanying drawing will provide a better understanding of the invention. It must be understood at the outset, however, that the invention is not restricted in any manner to the particular forms described, that it is capable of more extended uses than those stated herein and that many modifications may be readily apparent to a person skilled in the art.

Figure 1:
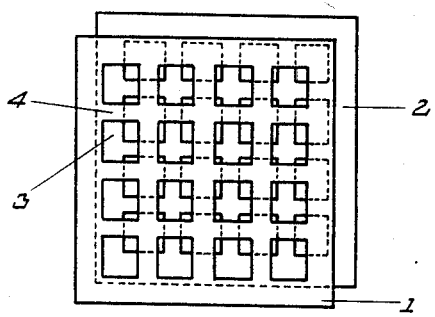
Figures 1, 2, 3 and 4 illustrate the basic principles of the invention.

Before entering into a detailed description of the invention, it should be understood that whenever the word "optical" is used in this specification or in the appended claims, it stands not only for radiations in the visibility region of the human eye, approximately from 380 to 780 millimicrons in wavelength, but also for radiations of wavelength too short or too long to be perceived by the human retina. This will be apparent from the description of the invention.

Referring more particularly to the drawing:

In Figure 1, two flat elements 1 and 2, made of metal, glass, quartz, gelatin film, Celluloid or other materials, are shown juxtaposed over one another face to face. Each of the elements 1 and 2 consists of a recurrent pattern of opaque and transparent rectangular portions 3 and 4. If the elements are made of an opaque material, such as sheet metal, the rectangles 3 are cut clear through the metal leaving the equivalent of a mesh of rectangles, similar to a wire-gauze screen or sieve. If the elements are made of a transparent material, such as glass or gelatin film, the rectangles 3 are opaque and made by printing, photographing, engraving or otherwise forming them on the transparent material. In Figure 1 the elements are shown as if made of opaque material, and constitute sieves of rectangular mesh.

When the elements 1 and 2 are juxtaposed in such a manner that the rectangles 3 and opaque interstices 4 of one element coincide exactly with those of the other element, the combination will appear, by normal transmitted light, as if only one element were being observed. The amount of radiation transmitted in this case will depend only upon the dimensions of the mesh formed by the rectangles 3 and interstices 4, as in a wire-gauze screen. In this case, the transmissibility of the combination will be the maximum.

If element 2 is displaced a certain distance in its own plane with respect to element 1 and in the direction of the diagonals of the rectangles 3, reaching a position such as that shown in Figure 1, no longer will the rectangles and interstices of one element coincide with those of the second element, and the amount of radiation transmitted by the combination will be smaller than in the case of exact correlation between the rectangles and interstices. The combination will have reached in that case, its minimum transmissibility.

Intermediate positions of the elements between the extreme cases considered will have intermediate transmissibilities for radiation. By setting the elements at any such intermediate position, the transmissibility of the combination can be adjusted at will between the indicated maximum and minimum values.

Two wire-gauze screens or sieves of square or rectangular mesh can be used as the elements 1 and 2, but since in general, it is desirable that the elements be juxtaposed very close together so as to minimize the effects of parallax, the use of wire-gauze screens, because of their thicknesses, is adaptable only to certain cases where parallax is of no importance, as with collimated light or with low speed optical systems.

A similar condition occurs with the usual filters of glass or gelatin film employed in optical work. The transmissibility of such filters is determined for radiation incident normally to the filter's surfaces. When the system is used with optical filters of high speed, the rays that fall at an angle on the filter have to go through a greater thickness than the normal rays. Consequently, the transmission is smaller for the angular than for the normal rays. For example, a gelatin filter having a transmissibility of 50 percent for the normal rays will transmit only 48 percent for the outside rays if used with a system where the filter aperture equals the object or image distance from the filter. Besides, the reflection loss is slightly greater for the angular than for the normal rays. These effects are usually disregarded when using gelatin film or glass filters.

Therefore, although the effect of parallax in my invention is probably greater than the effect just mentioned, it is probably of no great consequence in practical applications.

Figure 2:
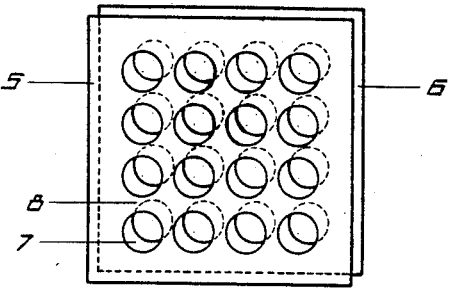

In Figure 2, a similar combination as that of Figure 1 is shown, except that each of the flat juxtaposed elements 5 and 6 has a recurrent pattern of opaque and transparent circular portions 7 and 8. Relative displacement of the elements a certain distance in a diagonal direction and in their own planes, will vary the transmissibility of the combination from the maximum value obtained when the circles of element 5 coincide with those of element 6, to a minimum value which depends upon the dimensions of the pattern.

Figure 3:
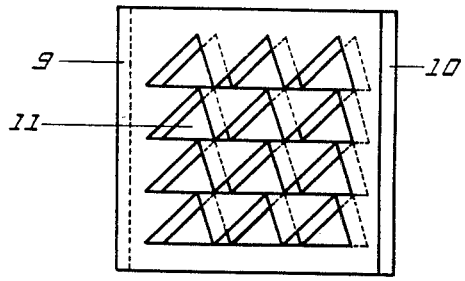

Figure 3 shown another possible combination. Instead of the rectangles of Figure 1 or the circles of Figure 2, each of the flat juxtaposed elements 9 and 10 has a recurrent pattern formed by opaque and transparent triangles 11. Displacement of element 9 with respect to element 10 a certain distance in its own plane and in a direction parallel to the bases of triangles 11, will vary the transmissibility of the combination from the maximum value which results when the triangles coincide, to a minimum value. Obviously, if the opaque portions are absolutely opaque and the transparent portions absolutely transparent, the minimum value is zero and the maximum value is one-half.

Figure 4:
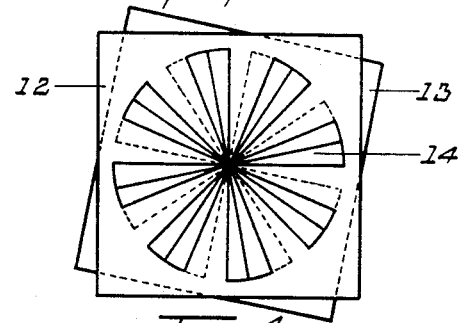

In Figure 4 is illustrated still another arrangement. Instead of circles, rectangles or triangles, the flat juxtaposed elements 12 and 13 have recurrent patterns formed by alternately opaque and transparent circular sectors 14 arranged about a common axis, as shown. Relative rotational displacement of element 13 with respect to element 12 about said axis will be the equivalent of opening or closing the sectors, thereby varying the transmissibility of the combination. Here again, there is a maximum and a minimum value of transmission.

Consequently, by means of two flat juxtaposed elements 1 and 2, 5 and 6, 9 and 10, or 12 and 13, I obtain an optical filter whose transparency can be adjusted at will within certain definite limits.

The considerations regarding the material of which the elements are made, and the character of the pattern, which were given regarding the combination of Figure 1, are obviously applicable also to the combinations of Figures 2, 3 and 4. It is also obvious that the patterns described are only representative of the many patterns which it is possible to use in the invention.

Two other points should be mentioned here. First, that it is not necessary that the patterns be identical in both elements; for example, one element may have a rectangular pattern and the other may have a circular pattern. Second, that the opaque portions may not be absolutely opaque, but may possess a certain transparency, and the transparent portions may not be absolutely transparent but may have selective absorption and transmission characteristics. Therefore, whenever the words opaque and transparent are used in this specification, they stand in reality for less diaphanous and more diaphanous, respectively.

In the manner explained, an infinite number of combinations may be secured, from non-selective (neutral) filters to selective filters, and of any desired transparency, except unity.

The transmission of the combination of regular patterns such as those shown in Figures 1, 2, 3 and 4 can be mathematically calculated. This represents a great advantage of the invention, since it makes possible to calculate beforehand and with precision, the characteristics of the filter.

For example, in the combination of Figure 1, of rectangular pattern, if the elements 1 and 2 are of opaque material (zero transparency) and the rectangles 3 are cut clear through the material (100 percent transparency), and if M and M' represent the meshes (number of rectangles per unit length) in the vertical and horizontal directions respectively, and A and A' stand for the vertical and horizontal dimensions of the rectangles, respectively, the maximum value of the transmission is given by the expression:

$$(1-MA)(1-M'A')$$

and the minimum value by the expression:

$$(1-2MA)(1-2M'A')$$

Corresponding expressions can be derived for the transparency of the other patterns.

Figure 6:
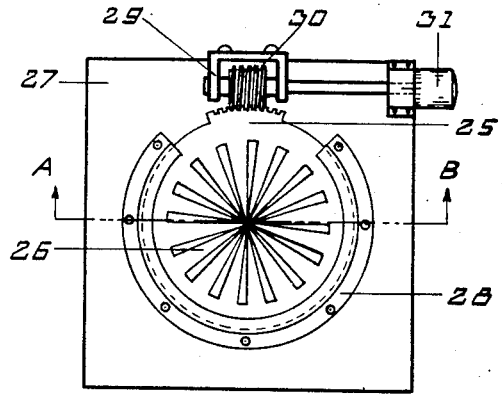
Figure 6 illustrates a modification of the device shown in Figure 5.
Figure 7:
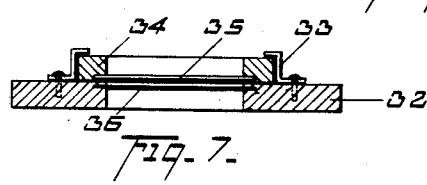
Figure 7 is a section view at A—B on Figures 5 and 6.

There are several mechanical devices that can be used for producing the relative displacement of the filter elements. Only two such devices will be described. They are illustrated in Figures 5, 6 and 7.

Figure 5:
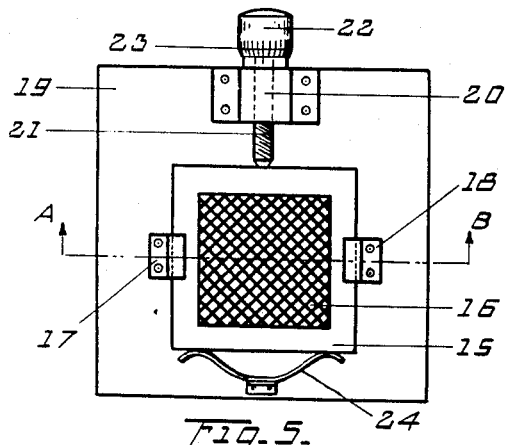
Figure 5 shows a device embodying the invention.

In Figure 5, a movable frame 15 carries one of the flat filter elements which are shown juxtaposed at 16 as a wire-gauze screen. Frame 15 is movable along the vertical direction along sliders 17 and 18, which are attached to a frame 19 and thereby hold both frames together. Fixed as shown to frame 19 is a screw-nut bracket 20 which carries a micrometer screw 21. The head or knob 22 of screw 21 carries a scale 23. On frame 19 is also fixed as shown a spring 24 which acts on frame 15 and holds it against the end of screw 21. On frame 19 is also fixed the second flat filter element, directly below the element carried by frame 15.

The operation of the device is very simple. The motion of screw 21 and the opposing action of spring 24 cooperate to move frame 15 along the vertical direction. The juxtaposed elements, therefore, will move relative to each other and produce the desired results.

The device illustrated in Figure 5 is applicable only to those cases where the displacement of the filter elements is rectilinear. For rotational displacement of the filter elements, such as is the case with elements 12 and 13 of Figure 4, the modification shown in Figure 6 is applicable.

In Figure 6, a rotatable frame 25 carrying one of the juxtaposed filter elements, which consist of circular sectors 26, is held against a second frame 27 by means of a circular slider member 28 which is fixed to frame 27. A bracket 29, also fixed to frame 27, carries a worm 30 which engages a toothed rack integral with the rotatable frame 25, as shown. Worm 30 is rotated by means of knob 31 which carries a scale like that of knob 22 of Figure 5. Rotation of knob 31 will produce the desired rotational displacement of frame 25 about its axis.

Figure 7 is a section view along line A—B of Figure 5 or 6. It shows the fixed frame 32 carrying the filter element 36, the sliders 33, the movable frame 34 which carries the filter element 35. With the construction shown, the two filter elements are juxtaposed closely together and face to face, which is the desired aim.

The scales carried by knobs 22 and 31 of Figures 5 and 6 will serve to give an indication of the position of the filter elements with respect to each other. Therefore, the scales can be calibrated in terms of the transparency of the combined juxtaposed elements, and any desired transparency of the combination can be readily reproduced by simply rotating the knobs 22 or 31 up to the corresponding calibrated position of the scales.

The invention is particularly useful as a neutral filter. In fact, it permits the control of the intensity of radiation in a known and definite manner without affecting the quality of the radiation. The usual neutral tint filters are really non-selective for only a certain spectral region; outside of that region, they show marked peaks of absorption or transmission, particularly in the infra-red. In my invention, the use of absolutely neutral filter elements, such as wire-gauze screens and perforated metal sheets, eliminates those restrictions entirely. For example, two No. 325 sieves of the Standard screen scale, show a maximum transmission of 30 percent and a minimum transmission of 1 percent when used as the filter elements of my invention; and, obviously, throughout this transmission range, the filter is absolutely neutral. The use of quartz and corex glass plates, which are transparent to the ultra-violet, as the material for the filter elements, also results in a practically neutral filter. For the visible region of the spectrum and the infra-red, the filter elements can be made of gelatin film or glass, which are non-selective in those regions.

It is clear, then, from the preceding description and drawing, that I have provided a simple, economical and fool-proof optical filter of selective or non-selective, variable and accurately adjustable transparency.

I claim:

1. An optical filter of continuously variable transparency within fixed limits comprising a pair of flat elements juxtaposed face to face, each of said elements consisting of a frame carrying a screen of rectangular mesh, and means for displacing said elements relative to each other in a direction diagonal to said mesh and in the plane of the elements, said means being calibrable in terms of the transparency of the combined juxtaposed elements.

2. An optical filter of continuously variable transparency within fixed limits comprising a pair of flat elements juxtaposed face to face, each of said elements consisting of a frame carrying a screen of rectangular mesh, and micrometer means for displacing said elements relative to each other in a diagonal direction to said mesh and in their plane, said micrometer means being calibrable in terms of the transparency of the combined juxtaposed screens.

3. An optical filter of continuously variable transparency within fixed limits comprising a pair of identically patterned elements juxtaposed face to face, each of said elements consisting of a frame carrying a screen of rectangular mesh, and micrometer means for displacing said elements relative to each other in a direction diagonal to said mesh and in their plane, said means being calibrable in terms of the transparency of the combined juxtaposed elements.

4. An optical filter of continuously variable transparency within fixed limits consisting of a pair of flat wire-gauze screens of rectangular mesh juxtaposed face to face, micrometer means for rectilineally displacing the screens relative to each other in a direction diagonal to said rectangular mesh and in the plane of the screens, said means being calibrable in terms of the transparency of the combined juxtaposed screens.

MELCHOR CENTENO, V.